United States Patent
Goldman-Shenhar et al.

(10) Patent No.: US 12,344,266 B2
(45) Date of Patent: Jul. 1, 2025

(54) SYSTEM AND METHOD FOR COMPUTING AUTOMATIC NOTIFICATIONS ABOUT A POLICY OF BEHAVIOR GENERATED BY AN ARTIFICIAL INTELLIGENCE ALGORITHM

(71) Applicant: GM Global Technology Operations LLC, Detroit, MI (US)

(72) Inventors: Claudia Goldman-Shenhar, Mevasseret Zion (IL); Ronit Bustin, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 18/316,492

(22) Filed: May 12, 2023

(65) Prior Publication Data
US 2024/0375672 A1 Nov. 14, 2024

(51) Int. Cl.
*B60W 50/14* (2020.01)
*B60W 60/00* (2020.01)
*G06N 5/01* (2023.01)

(52) U.S. Cl.
CPC ........ *B60W 50/14* (2013.01); *B60W 60/0011* (2020.02); *G06N 5/01* (2023.01); *B60W 2050/143* (2013.01); *B60W 2050/146* (2013.01)

(58) Field of Classification Search
CPC ............. B60W 50/14; B60W 60/0011; B60W 2050/143; B60W 2050/146; G06N 5/01
USPC ........................................................ 340/539
See application file for complete search history.

(56) References Cited

U.S. PATENT DOCUMENTS

| | | | |
|---|---|---|---|
| 10,885,905 B2 * | 1/2021 | Srinivasan | G06F 3/167 |
| 11,915,589 B2 * | 2/2024 | Orlando | B60R 21/0134 |
| 2019/0025067 A1 * | 1/2019 | Bärecke | G01C 21/3415 |
| 2020/0159232 A1 * | 5/2020 | Refaat | G06V 20/54 |
| 2023/0306377 A1 * | 9/2023 | Jacobs | G06N 7/01 |
| 2024/0092398 A1 * | 3/2024 | Caldwell | B60W 10/20 |
| 2024/0355206 A1 * | 10/2024 | Abdelraouf | G06V 40/174 |

\* cited by examiner

*Primary Examiner* — Omar Casillashernandez
(74) *Attorney, Agent, or Firm* — CANTOR COLBURN LLP

(57) ABSTRACT

A vehicle capable of operating autonomously, a system for generating a notification for a behavior of the vehicle includes a method of generating the notification using artificial intelligence. The system includes an interface and a processor. The processor is configured to determine a current state of the vehicle, determine probabilities for a plurality of trajectories through a behavior model of the vehicle, each trajectory indicating one or more decisions from the current state to a subsequent state of the vehicle using the behavior model for the vehicle, generate a message to be presented as the vehicle performs the behavior that is determined by the artificial intelligence system, wherein the behavior is selected based on the probabilities, determine a temporal parameter for the message, determine a modality parameter for the message, and present the message at the interface using the temporal parameter and the modality parameter.

20 Claims, 7 Drawing Sheets

SYSTEM AND METHOD FOR COMPUTING AUTOMATIC NOTIFICATIONS ABOUT A POLICY OF BEHAVIOR GENERATED BY AN ARTIFICIAL INTELLIGENCE ALGORITHM

INTRODUCTION

The subject disclosure relates to autonomous and semi-autonomous vehicles and, in particular, to a system and method for explaining an action of an autonomous or semi-autonomous vehicle to a passenger or driver in order to allay concerns of the passenger or driver.

Artificial Intelligence (AI) can be used in an autonomous or semi-autonomous vehicle to determine an action for the vehicle to take. AI algorithms are applied to compute and determine driving behaviors for semi-autonomous and fully autonomous vehicles. Often the computed driving behavior is different than that which would be taken by an occupant of the vehicle, were the occupant driving the vehicle. As a result, the occupant can experience concern, confusion, or anxiety when experiencing the actions taken by the vehicle. Accordingly, it is desirable to provide a method for notifying the occupant of an action taken by the vehicle and explains a reason for the action in order to reduce any concerns of the occupant.

SUMMARY

In one exemplary embodiment, a method of generating a notification for a behavior of a vehicle computed using an artificial intelligence system to operate the vehicle autonomously or semi-autonomously is disclosed. A current state of the vehicle is determined. Probabilities for a plurality of trajectories are determined through a behavior model of the vehicle, each trajectory indicating one or more decisions from the current state to a subsequent state of the vehicle using the behavior model for the vehicle. A message is generated to be presented as the vehicle performs a behavior that is determined by the artificial intelligence system, wherein the behavior is selected based on the probabilities. A temporal parameter is determined for the message. A modality parameter is determined for the message. The message is presented using the temporal parameter and the modality parameter.

In addition to one or more of the features described herein, the behavior model is created using a model-based planning artificial intelligence solution that is evaluated offline to produce the probabilities of transitions between states. The behavior model is created by a model-based planning artificial intelligence solution that includes a decision tree and a trajectory includes a plurality of nodes of the decision tree between the current state and the subsequent state, further comprising determining the probability of the trajectory based on the plurality of nodes between the current state and the subsequent state. The method further includes selecting a sub-trajectory of the trajectory, the sub-trajectory including a subset of the plurality of nodes between the current state and the subsequent state, selecting a significant action of the sub-trajectory, and generating the message based on the significant action. The method further includes selecting a set of optimal trajectories from the plurality of trajectories and a set of optimal behaviors associated with the set of optimal trajectories based on a probability of the set of optimal trajectories. The temporal parameter is selected using one of a pre-determined rule, a confidence value determined using artificial intelligence, a value of an action, and an entropy value. The message explains a reason for the behavior of the vehicle, wherein the reason is based on at least one of an action taken by the vehicle, a sequence of actions taken by the vehicle, a feature of the action taken by the vehicle, a feature of a state of the vehicle when the action is taken by the vehicle, a value of the action taken by the vehicle, and the action not taken by the vehicle.

In another exemplary embodiment, a system for generating a notification for a behavior of a vehicle computed using an artificial intelligence system to operate the vehicle autonomously is disclosed. The system includes an interface and a processor. The processor is configured to determine a current state of the vehicle, determine probabilities for a plurality of trajectories through a behavior model of the vehicle, each trajectory indicating one or more decisions from the current state to a subsequent state of the vehicle using the behavior model for the vehicle, generate a message to be presented as the vehicle performs the behavior that is determined by the artificial intelligence system, wherein the behavior is selected based on the probabilities, determine a temporal parameter for the message, determine a modality parameter for the message, and present the message at the interface using the temporal parameter and the modality parameter.

In addition to one or more of the features described herein, the processor is further configured to create the behavior model using a model-based planning artificial intelligence solution that is evaluated offline to produce the probabilities of transitions between states. The processor is further configured to create the behavior model based on a model-based planning artificial intelligence solution that includes a decision tree and a trajectory includes a plurality of nodes of the decision tree between the current state and the subsequent state, further comprising determining the probability of the trajectory based on the plurality of nodes between the current state and the subsequent state. The processor is further configured to select a sub-trajectory of the trajectory, the sub-trajectory including a subset of the plurality of nodes between the current state and the subsequent state, select a significant action of the sub-trajectory, and generate the message based on the significant action. The processor is further configured to select a set of optimal trajectories from the plurality of trajectories and a set of optimal behaviors associated with the set of optimal trajectories based on a probability of the set of optimal trajectories. The processor is further configured to select the temporal parameter using one of a pre-determined rule, a confidence value determined using artificial intelligence, a value of an action, and an entropy value. The message explains a reason for the behavior of the vehicle, wherein the reason is based on at least one of an action taken by the vehicle, a sequence of actions taken by the vehicle, a feature of the action taken by the vehicle, a feature of a state of the vehicle when the action is taken by the vehicle, a value of the action taken by the vehicle, and the action not taken by the vehicle.

In yet another exemplary embodiment, a vehicle capable of operating autonomously is disclosed. The vehicle includes an interface and a processor. The processor is configured to determine a current state of the vehicle, determine probabilities for a plurality of trajectories through a behavior model of the vehicle, each trajectory indicating one or more decisions from the current state to a subsequent state of the vehicle using the behavior model for the vehicle, generate a message to be presented as the vehicle performs a behavior that is determined by an artificial intelligence system, wherein the behavior is selected based on the probabilities, determine a temporal parameter for the message, determine a modality parameter for the message, and present the message at the interface using the temporal parameter and the modality parameter.

In addition to one or more of the features described herein, the processor is further configured to create the behavior model using a model-based planning artificial intelligence solution that is evaluated offline to produce the probabilities of transitions between states. The processor is further configured to create the behavior model based on a model-based planning artificial intelligence solution that includes a decision tree and a trajectory includes a plurality of nodes of the decision tree between the current state and the subsequent state, further comprising determining a probability of the trajectory based on the plurality of nodes between the current state and the subsequent state. The processor is further configured to select a sub-trajectory of the trajectory, the sub-trajectory including a subset of the plurality of nodes between the current state and the subsequent state, select a significant action of the sub-trajectory, and generate the message based on the significant action. The processor is further configured to select a set of optimal trajectories from the plurality of trajectories and a set of optimal behaviors associated with the set of optimal trajectories based on a probability of the set of optimal trajectories. The message explains a reason for the behavior of the vehicle, wherein the reason is based on at least one of an action taken by the vehicle, a sequence of actions taken by the vehicle, a feature of the action taken by the vehicle, a feature of a state of the vehicle when the action is taken by the vehicle, a value of the action taken by the vehicle, and the action not taken by the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
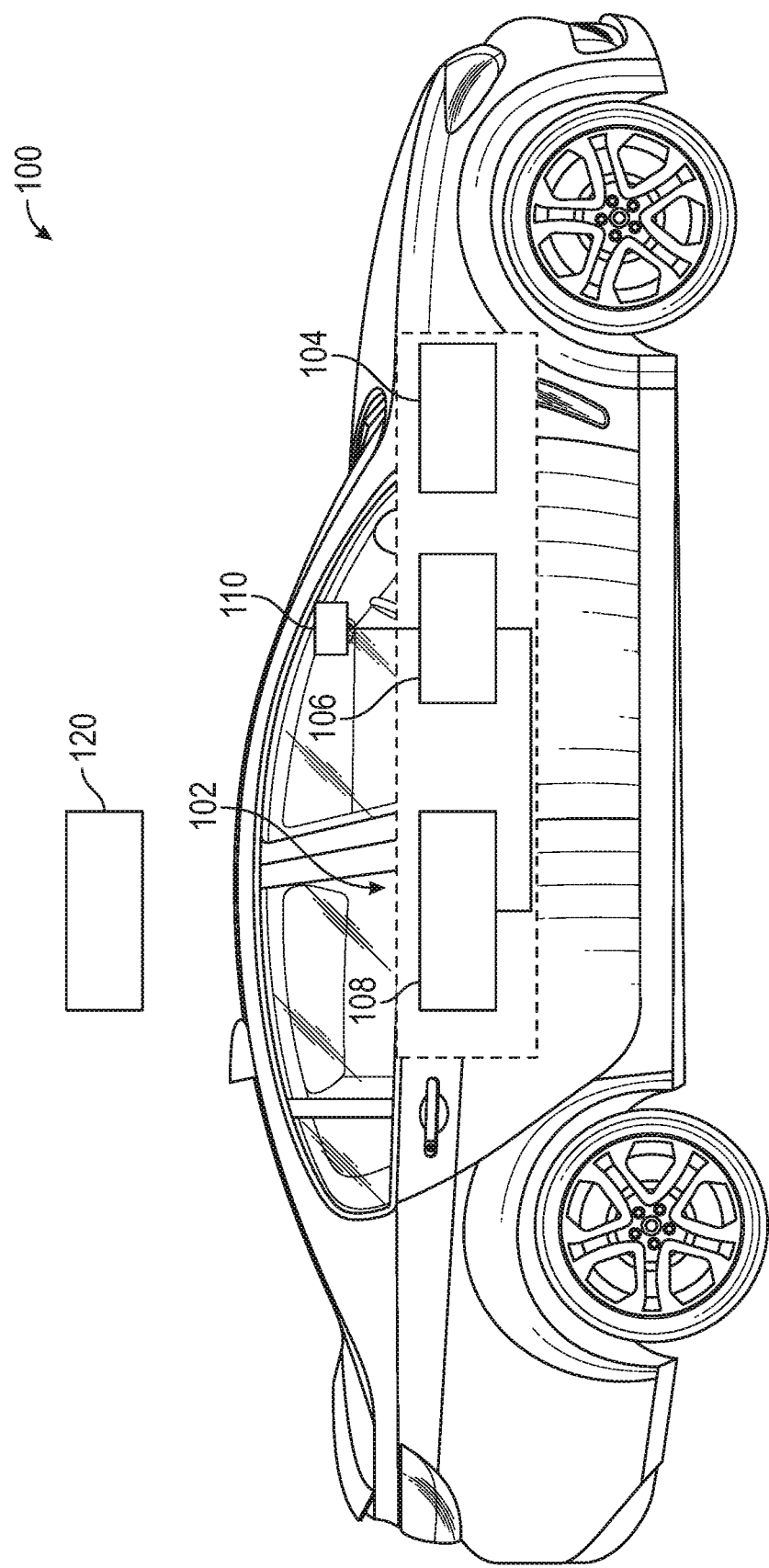
FIG. 1 shows a vehicle that can be operated in an autonomous mode or automated mode, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100 that can be operated in an autonomous mode or automated mode. The vehicle 100 can be a fully autonomous vehicle or a semi-autonomous vehicle. The vehicle 100 includes a driving system 102 that controls autonomous operation of the vehicle. The driving system 102 includes a sensor system 104 for obtaining information about the surrounding or environment of the vehicle 100, a controller 106 for computing possible actions for the autonomous vehicle based on the obtained information and for implementing one or more of the possible actions, and a human machine interface 108 for explaining the actions taken by the vehicle to an occupant of the vehicle, such as a driver or passenger. The human machine interface 108 need not be dedicated only to explaining actions and can be an interface that is used in the vehicle for purposes other than for explaining the actions. The sensor system 104 can include devices such as cameras, Lidar, radar, GPS, etc. The controller 106 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 106 may include a non-transitory computer-readable medium that stores instructions which, when processed by one or more processors of the controller 106, implement a method of selecting an action for the vehicle 100 and providing a message explaining the action to an occupant of the vehicle, according to one or more embodiments detailed herein. The controller 106 can operate programs that perform artificial intelligence. The human machine interface 108 can include one or more interfaces, such as a speaker, a display, a haptic device, etc. Each interface is suitable for a given modality of a message. For example, the speaker can be employed to present an aural message. The display can be employed to present a written message or graph. The haptic device can be employed to present tactile message, such as a vibration, that is felt by the occupant. In another embodiment, the human machine interface 108 can be a mobile device than can be used by the occupant either while inside the vehicle or outside the vehicle.

The vehicle 100 also includes a communication unit 110 that can communicate with a remote processor 120. In various embodiments, the messages can be provided to the remote processor 120, where it can be analyzed by engineers or operators to better understand the behavior of the artificial intelligence programs.

Figure 2:
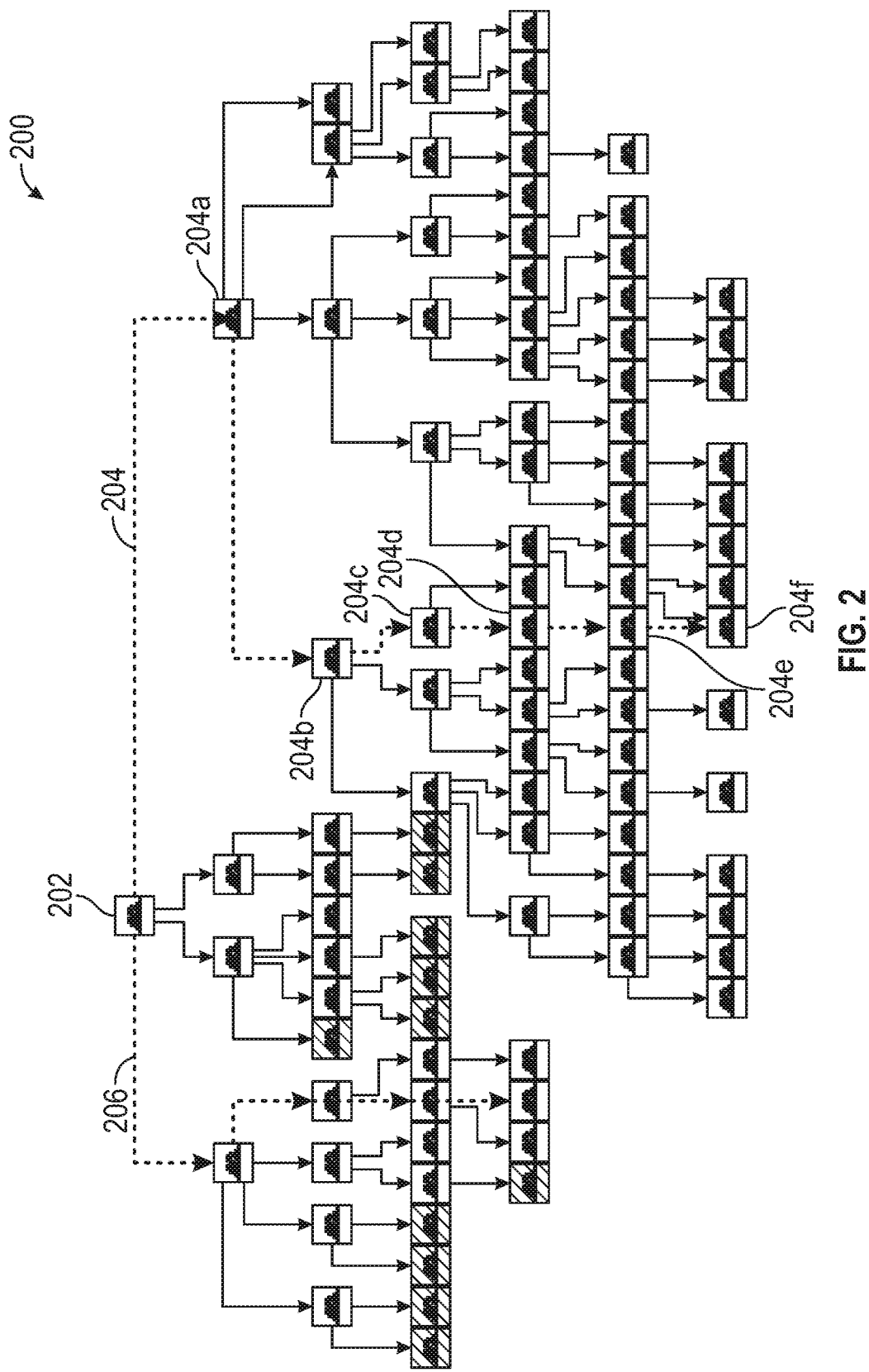
FIG. 2 shows a behavior model that can be used by the controller to select an action to be performed at the vehicle, in an illustrative embodiment.

FIG. 2 shows a behavior model 200 that can be used by the controller 106 to select an action to be performed at the vehicle 100, in an illustrative embodiment. The behavior model 200 includes a decision tree having a plurality of nodes. An edge connects any two nodes of the decision tree. Each node represents a state of the vehicle, and each edge represents an action that takes the vehicle from one state to another state (a subsequent state or future state). The top node (or root node) of the decision tree represents a current state of the vehicle. Subsequent possible states are shown below the top node. Each action or edge has an associated probability. A sequence of actions through the behavior model 200 is referred to as a trajectory. In using the behavior model 200, the controller 106 starts at the root node (i.e., the current state of the vehicle). The controller 106 selects an action to take by performing an optimization algorithm that considers all possible futures in the decision tree as evaluated from the root node. Once the action is executed, the vehicle now moves to a resulting state. The controller 106 identifies the resulting state as a new root node and a new tree is expanded so that the optimization algorithm can be performed from the new root node. The controller can operate an artificial intelligence planning system to optimize a sequential decision-making process to arrive at an automated behavior. In one embodiment, the sequential decision-making process can be implemented as in the Monte Carlo Tree Search algorithm.

From the current state so (first state 202) the controller can calculate a plurality of trajectories through the decision tree to reach a desired end state or subsequent state and can calculate probabilities for each of the trajectories. A first expected trajectory 204 and a second expected trajectory 206 are shown for illustrative purposes. The first expected trajectory passes sequentially through states 204a, 204b, 204c, 204d, 204e and 204f. For illustrative purposes, the first expected trajectory 204 can be a trajectory that has a highest expected value based on the decision process.

A model-based planning system includes constructing a decision tree and extracting trajectories from the decision tree. This system can either precisely expand the future states for the vehicle or approximate the future states, given some internally approximated model, a trajectory can then be computed. An illustrative example of a decision tree is shown in FIG. 3 using a model-based planning system, such as the decision tree shown in FIG. 3, or a model-free planning system.

In a model-free planning system, there is a training period where the planner learns a policy of behavior offline, including a likelihood of reaching a state s' from a current state so given an action. For example, the model-free planning system includes an internal model that is allowed to emulate or estimate the likely outcome of applying a specified action from a specified state. In doing so, the system builds a search tree (such as shown in FIG. 2), regardless of whether the search tree is part of an artificial intelligence planning algorithm. The planner then will apply the learned policy in real time. The model-free planning system can also adjust its policy based on information evaluated online.

Figure 3:
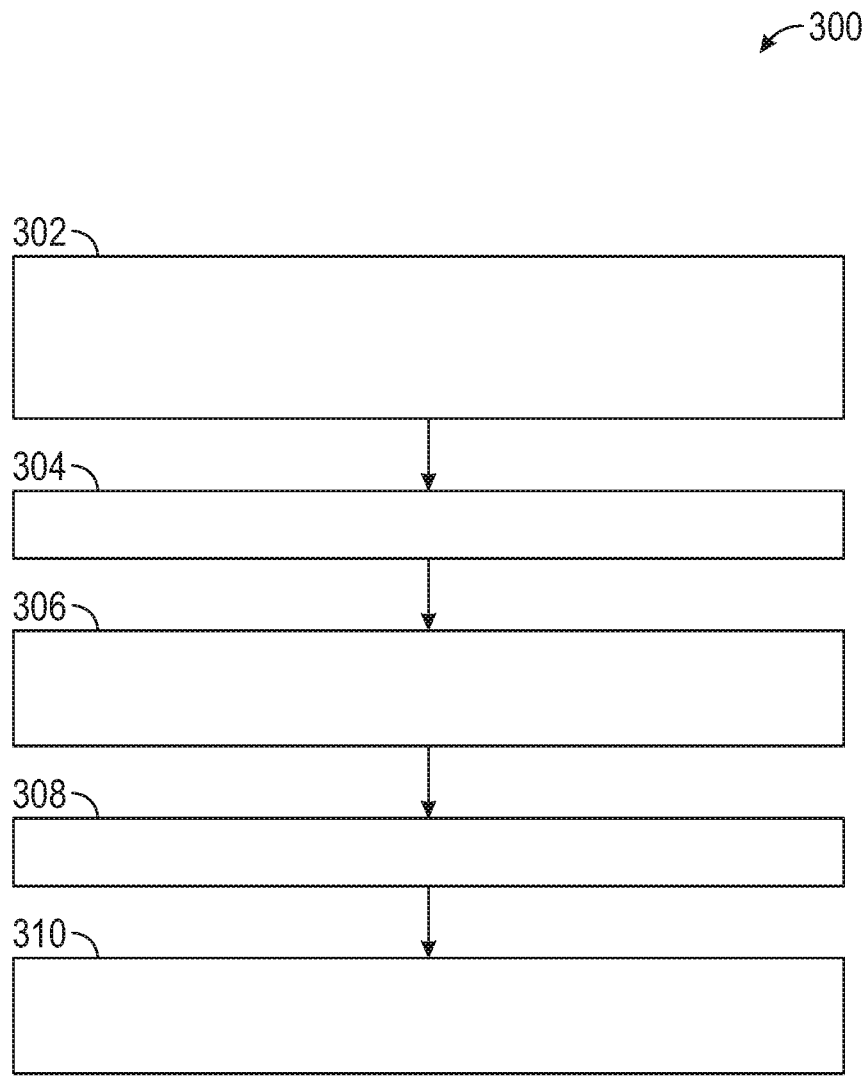
FIG. 3 shows a flowchart of a method for generating a message for an action taken by the vehicle, in an embodiment.

FIG. 3 shows a flowchart 300 of a method for generating a message for an action taken by the vehicle 100, in an embodiment. In box 302 an action is selected based on a behavior model being used at the vehicle 100. If necessary, the behavior model can be generated prior to selecting the action. For example, an algorithm can create a search tree representing a plurality of trajectories of possible futures. The algorithm can determine a behavior to follow at the root of the search tree based on these possible trajectories. In box 304, an explanation for the selected action or behavior is generated. The explanation can include a reason or reasons for taking the selected action or for following a behavior as well as a reason for not taking a non-selected action or actions or for not following another behavior. In box 306, a temporal parameter for presenting the explanation is determined. The temporal parameter can include a time at which the message is presented to the occupant, a duration of the message, etc. In box 308, a modality for presenting the message is selected. In box 310, a message is presented at an interface that includes the explanation. The message is presented using a modality parameter and the temporal parameter.

Figure 4:
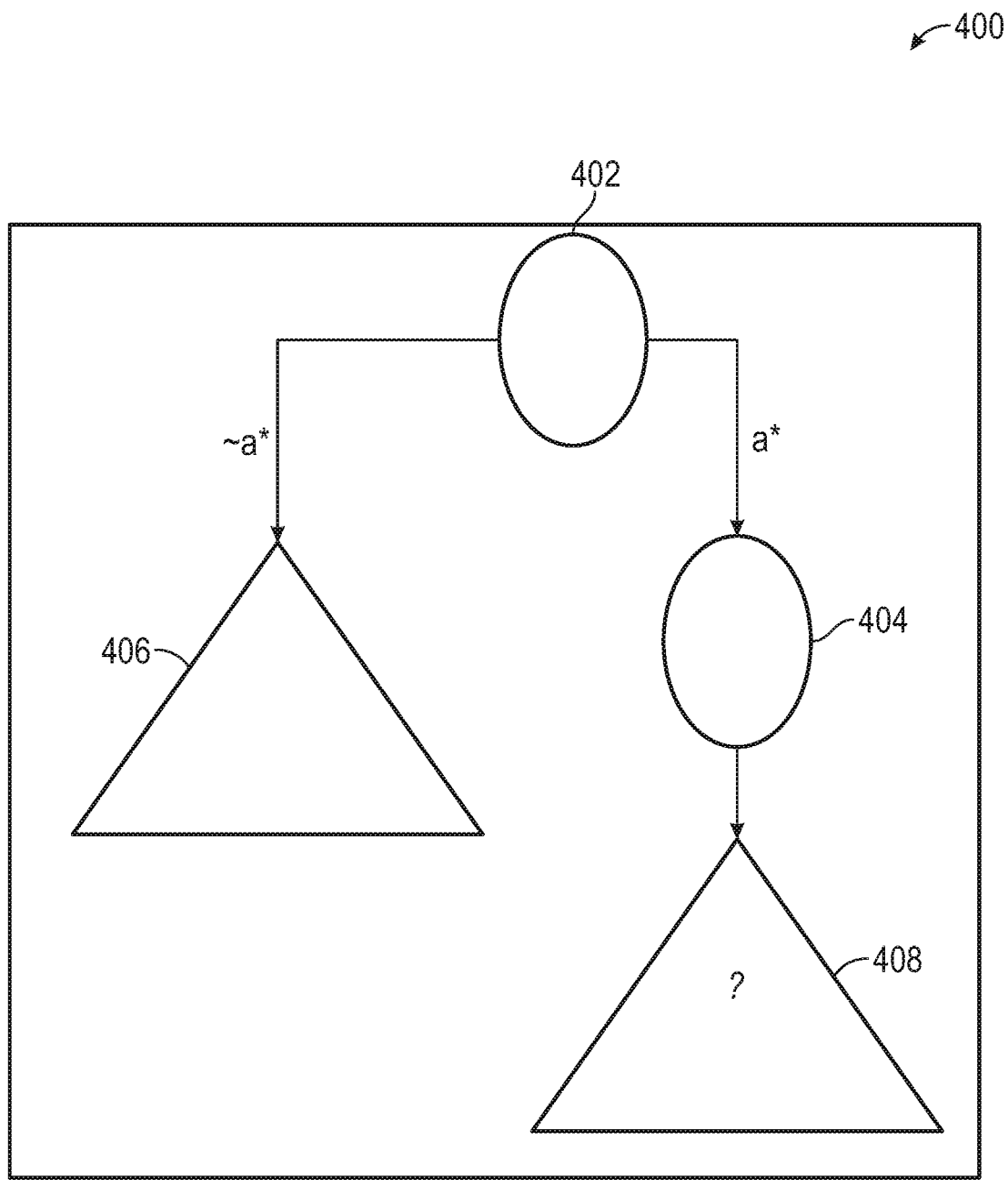
FIG. 4 shows a diagram that generalizes a trajectory through the decision tree shown in FIG. 2.

FIG. 4 shows a diagram 400 that generalizes a trajectory through the decision tree shown in FIG. 2. The diagram 400 shows the current state 402 as well as a next state 404 that is reached by implementing the selected action (e.g., optimal action a*). First triangle 406 represents those states that are not reached by performing the optimal action (i.e., those states corresponding to all of the non-optimal actions ~a*). Second triangle 408 represents states that are expected by the controller 106 after taking any actions that are possible from the next state 404.

Figure 5:
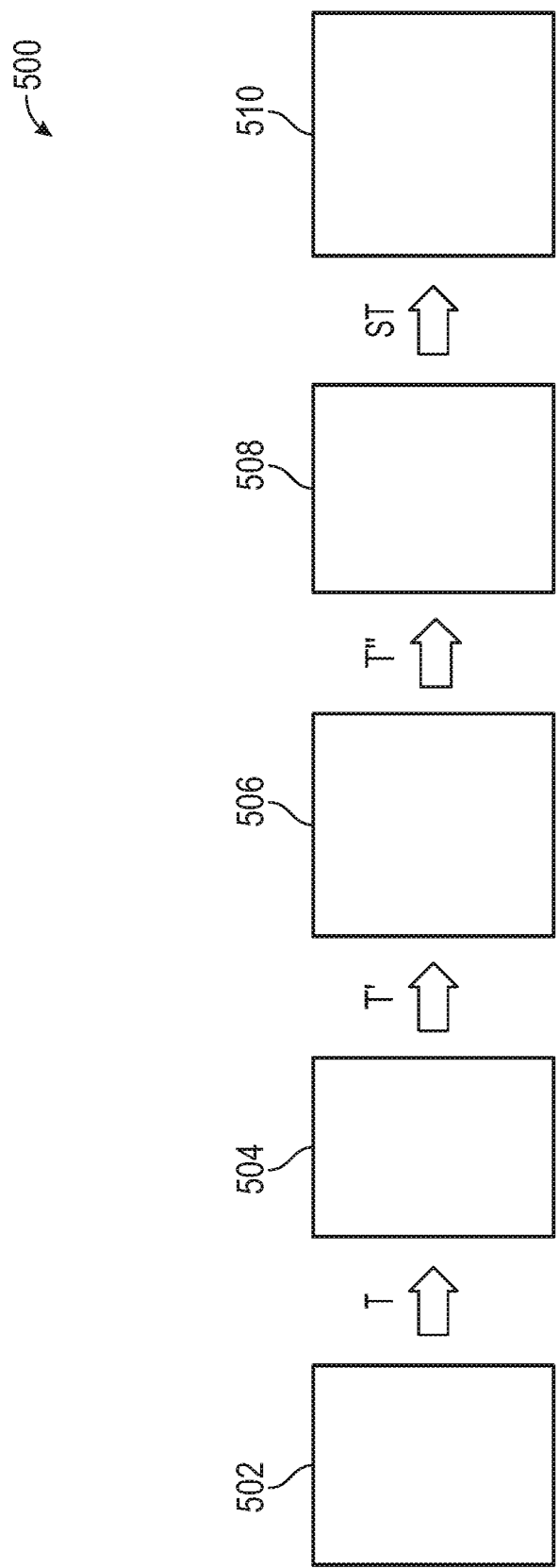
FIG. 5 shows a flowchart illustrating a method for generating a message to present that explains an action taken by the driving system to an occupant, in an embodiment.

FIG. 5 shows a flowchart 500 illustrating a method for generating a message to present that explains an action taken by the driving system 102 to an occupant, in an embodiment. The method of flowchart 500 explains the action only through a positive assessment of the action. In various embodiments, the message explains the most likely future path for the vehicle (i.e., next actions, next values, next states, etc.) based on taking the optimal action a*, as well as what is expected to happen next once the optimal action a* is taken. In box 502, a trajectory through the decision tree is calculated for the optimal action a*. For example, a trajectory can be created by choosing, at each state, the next state with highest probability. The trajectory T visits a plurality of nodes of the decision tree. For example, the number of states visited by the trajectory T can be 100 states. Using the first expected trajectory 204 of FIG. 2, the trajectory T includes the first state so and the subsequent states 204a-204f.

In box 504, the trajectory T can be shortened to a sub-trajectory T'. The number of visited nodes in the trajectory T can be reduced to a value set by a length criterion or by a certainty threshold. Using the length criterion, the length of the trajectory can be limited to a selected value k. For example, the sub-trajectory can include a subset of the nodes of the trajectory T, such as the first state 202 and states 204a-240d. When the certainty threshold, it is understood that nodes that are far down the decision tree have high uncertainties (i.e., low certainty) of being reached. Therefore, applying a certainty threshold to the trajectory T allows the resulting sub-trajectory T' to include only those nodes with certainty levels above the threshold.

In box 506, the sub-trajectory T' is reduced to one or more significant actions T" using a significance criterion. The states of the significant action T" can be selected using an information-based criterion or a value-based criterion. A tabulation can be made of the actions in the sub-trajectory T' to determine which action is the significant action of the sub-trajectory T', or which action occurs the most often in the sub-trajectory T' or which actions occur in a greatest amount or by an amount greater than a selected criterion. For example, a sub-trajectory may include 10 accelerations and one deceleration. Thus, the acceleration is the significant action of the sub-trajectory.

In box 508, a semantic explanation ST is generated based on the signification actions T". The regular expressions for the significant actions T" are parsed into semantic maneuvers. In box 510, the semantic explanation ST is formatted and presented to the occupant to explain a reason for the behavior of the vehicle. The reason can be based on the action taken by the vehicle, a feature of the action taken by the vehicle, a value of the action taken by the vehicle, a feature of features of the states, or a combination thereof. Exemplary explanations can include "speeding up quickly, then accelerating," "slowing down, then accelerating quickly," "speeding up for an extended period," etc. Once the explanation is determined, one or more presentation parameters are determined for the message, such as a temporal parameter or a modality parameter, as discussed herein.

Figure 6:
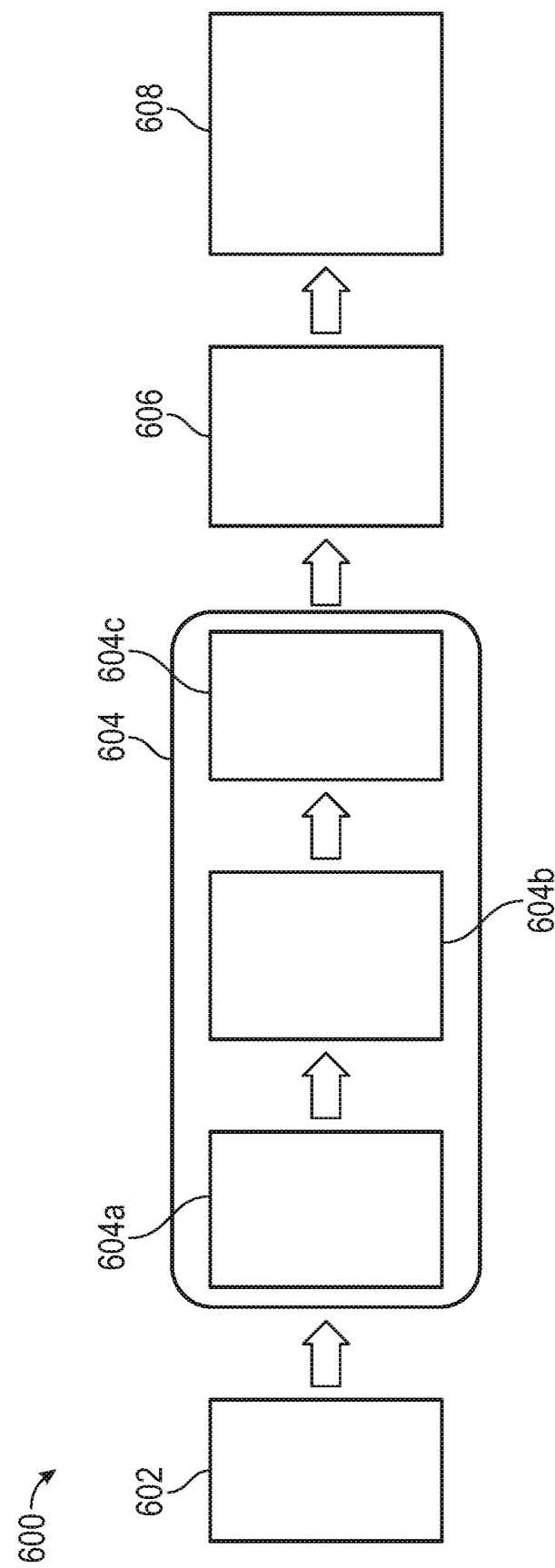
FIG. 6 shows a flowchart illustrating an alternative method for generating a message to present that explains an action taken by the driving system.

FIG. 6 shows a flowchart 600 illustrating an alternative method for generating a message to present that explains an action taken by the driving system 102. The alternative method includes generating an explanation based on a non-optimal trajectory or an action which is not taken by the vehicle 100. Such explanations are called contrastive explanations.

In box 602, one or more non-optimal trajectories b* are computed. In box 604, a significance of the non-optimal trajectory b* is determined. The procedure in box 604 includes boxes 604a, 604b and 604c. In box 604a, the non-optimal trajectory is determined (similar to what is done in box 504 to the optimal trajectory a*).

In box 604b, a sub-trajectory is determined for the non-optimal trajectory (similar to what is done in box 504). In box 604c, significant actions are obtained from the sub-trajectory (similar to what is performed in box 506). In box 606, a semantic explanation is generated based on the significant actions identified in box 604c. In box 608, the semantic explanation is formatted and presented to the occupant. The message can include a first part that presents the optimal action and a second part that states a reason for not taking another maneuver. Exemplary explanations can include "speeding up quickly because it will work better than speeding up," "speeding up quickly because it will work better than slowing down," "making a left turn change because it will work better than maintaining speed in this lane," etc.

Figure 7:
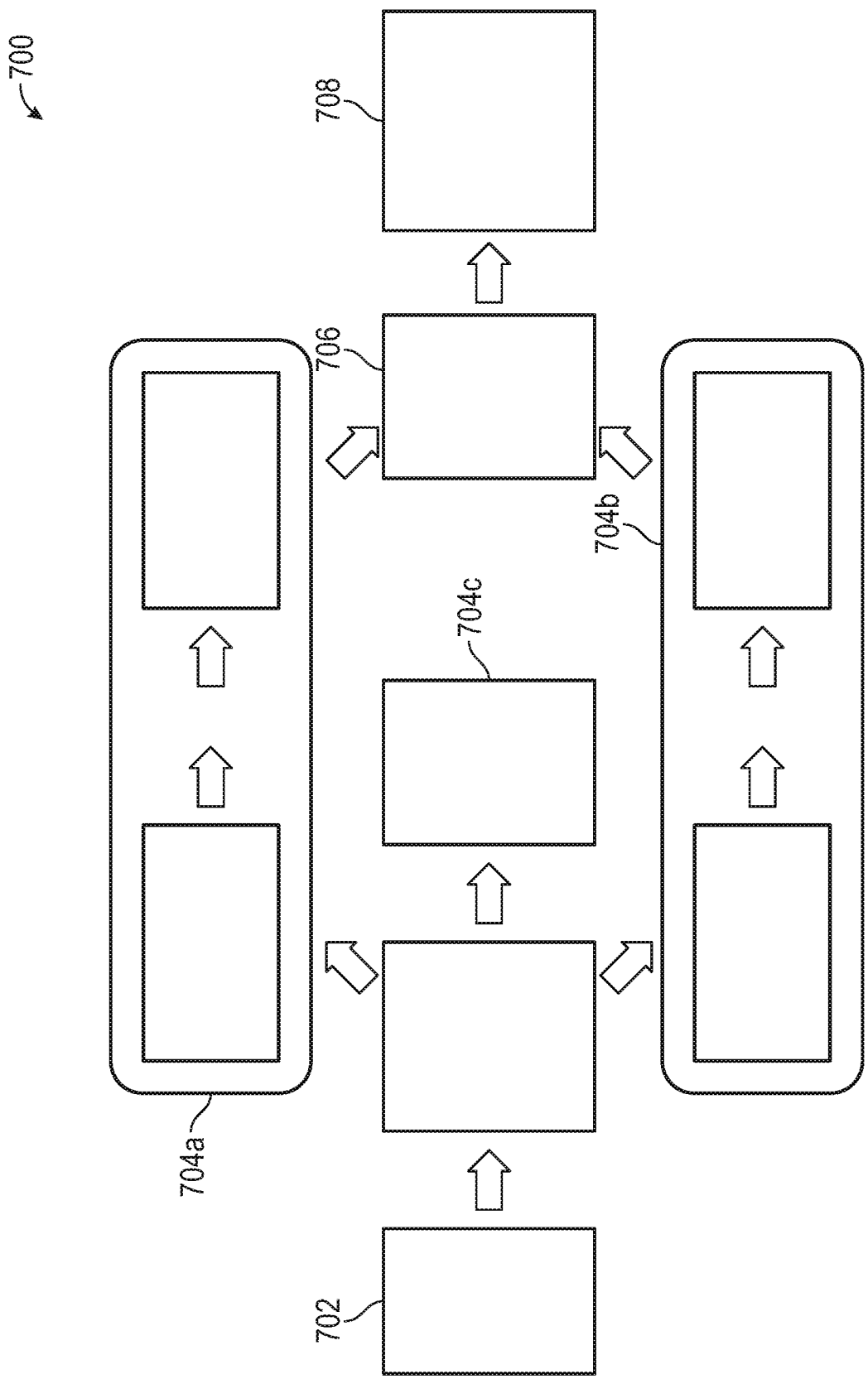
FIG. 7 shows a flowchart of a method for generating a message to present that explains an action taken by the driving system that includes multiple possible explanations.

FIG. 7 shows a flowchart 700 of a method for generating a message to present that explains an action taken by the driving system 102 that includes multiple possible explanations. In box 702, a distribution is computed for actions per level of the decision tree. In box 704, a decision is made whether to provide a positive message (i.e., an explanation based on the selected or optimal action a*) or a contrastive explanation (i.e., an explanation based on the actions not taken), or to provide no explanation at all.

If a positive message is selected, the method proceeds to box 704a. If a contrastive message is selected, the method proceeds to box 704b. If no message is selected, the method proceeds to box 704c. In box 704a, the method discussed with respect to FIG. 5 (i.e., in boxes 502, 504 and 506) is performed. In box 704b, the method discussed with respect to FIG. 6 (i.e., in boxes 604a, 604c and 604c) is performed. For either box 704a or box 704b, the method proceeds to box 706. In box 706, a semantic explanation is generated based on the results of either box 704a or box 704b. In box 708, the semantic explanation is formatted and presented to the occupant.

Presenting the message includes determining a temporal parameter for presenting the message (i.e., a time and duration for the message) as well as a modality or choice of interface. The temporal parameter can be selected using a rules-based process, an information-based process, by value or by uncertainty or entropy value.

The rules-based process following an "if <condition> then <output explanation>" format. For example, a message is presented when a selected action is about to take place along a specific road setting or network setting (e.g., at merge ramp, an exit maneuver). In another example, a message is presented if the selected action is greater than a threshold (e.g., a major acceleration, a major deceleration, a change of speed that causes a jerk). As another example, the message is shown any time there is a lane change.

The information-based process includes presenting the message based on a criterion relating the action to a distribution of the actions. A criterion can be applied to select the significant actions. This may be an information-based criterion that examines in some way the distribution of the possible actions in its determination of which are marked as dominant. For example, if there are one or two actions that are selected as significant actions, then an explanation can be generated. If only one action is significant, then the explanation is a positive one (i.e., take the path to box 704a). If there are two significant actions, then a contrastive explanation is generated (i.e., take the path of box 704b). If there are more than three actions that are selected as significant actions, then no explanation is generated (i.e., box 704c).

Selecting the temporal parameter by value can include generating an explanation only when a computed value of the selected action is above or below a threshold value. Selecting the temporal parameter by uncertainty or entropy value can include generating an explanation when the entropy of the data structure representing the selected action is below an entropy threshold. For example, the entropy can be computed for a Monte Carlo tree structure when the root of the tree represents the current state for which the action is chosen.

The duration of the message can also be determined using these processes. For example, the message can be shown for a selected duration (e.g., 2 seconds) according to a pre-set setting. In a rule-based process, the duration can be related to the context of the action. For actions that take longer periods to execute, the message can be presented for a longer time. The message can also be presented for a longer time when the message is associated with a selectee geographic location or traffic condition. In a predictive process, the duration can be calculated as a function of what is predicted to occur next and/or the significance of the next action to the explanation.

The message can be presented to the occupant using various modalities, including aural, visual or graphical. An aural modality includes applying a speech-generating program to a sentence or phrase that includes the explanation. In a visual modality, a textual notification can be shown at a display or on a mobile device. In a graphical modality, a graphic representing the information can be shown on the display or mobile device.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of generating a notification for a behavior of a vehicle computed using an artificial intelligence system to operate the vehicle autonomously or semi-autonomously, comprising:
    determining a current state of the vehicle;
    creating a behavior model of the vehicle by a model-based planning artificial intelligence solution that includes a decision tree and a plurality of trajectories, each trajectory including a plurality of nodes of the decision tree between the current state and a subsequent state;
    determining probabilities for the plurality of trajectories through the behavior model, wherein the probability of each trajectory is based on the plurality of nodes between the current state and the subsequent state;
    selecting a sub-trajectory of the trajectory, the sub-trajectory including a subset of the plurality of nodes between the current state and the subsequent state;
    selecting a significant action of the sub-trajectory;
    generating a message based on the significant action, the message to be presented as the vehicle performs a behavior that is determined by the artificial intelligence system, wherein the behavior is selected based on the probabilities;
    determining a temporal parameter for the message;
    determining a modality parameter for the message; and
    presenting the message using the temporal parameter and the modality parameter.

2. The method of claim 1, wherein the behavior model is created using a model-based planning artificial intelligence solution that is evaluated offline to produce the probabilities of transitions between states.

3. The method of claim 1, further comprising selecting a set of optimal trajectories from the plurality of trajectories and a set of optimal behaviors associated with the set of optimal trajectories based on a probability of the set of optimal trajectories.

4. The method of claim 1, wherein the temporal parameter is selected using one of: (i) a pre-determined rule; (ii) a confidence value determined using artificial intelligence; (iii) a value of an action; and (iv) an entropy value.

5. The method of claim 1, wherein the message explains a reason for the behavior of the vehicle, wherein the reason is based on at least one of: (i) an action taken by the vehicle; (ii) a sequence of actions taken by the vehicle; (iii) a feature of the action taken by the vehicle; (iv) a feature of a state of the vehicle when the action is taken by the vehicle;
    (v) a value of the action taken by the vehicle; and (vi) the action not taken by the vehicle.

6. A system for generating a notification for a behavior of a vehicle computed using an artificial intelligence system to operate the vehicle autonomously, comprising:
    an interface;
    a processor configured to:
        determine a current state of the vehicle;
        create a behavior model of the vehicle by a model-based planning artificial intelligence solution that includes a decision tree and a plurality of trajectories, each trajectory including a plurality of nodes of the decision tree between the current state and a subsequent state;
        determine probabilities for the plurality of trajectories through behavior model, wherein the probability of each trajectory is based on the plurality of nodes between the current state and the subsequent state;
        select a sub-trajectory of the trajectory, the sub-trajectory including a subset of the plurality of nodes between the current state and the subsequent state;
        select a significant action of the sub-trajectory;
        generate a message based on the significant action, the message to be presented as the vehicle performs the behavior that is determined by the artificial intelligence system, wherein the behavior is selected based on the probabilities;
        determine a temporal parameter for the message;
        determine a modality parameter for the message; and
        present the message at the interface using the temporal parameter and the modality parameter.

7. The system of claim 6, wherein the processor is further configured to create the behavior model using a model-based planning artificial intelligence solution that is evaluated offline to produce the probabilities of transitions between states.

8. The system of claim 6, wherein the processor is further configured to select a set of optimal trajectories from the plurality of trajectories and a set of optimal behaviors associated with the set of optimal trajectories based on a probability of the set of optimal trajectories.

9. The system of claim 8, wherein the processor is further configured to select the temporal parameter using one of: (i) a pre-determined rule; (ii) a confidence value determined using artificial intelligence; (iii) a value of an action; and (iv) an entropy value.

10. The system of claim 6, wherein the message explains a reason for the behavior of the vehicle, wherein the reason is based on at least one of: (i) an action taken by the vehicle; (ii) a sequence of actions taken by the vehicle; (iii) a feature of the action taken by the vehicle; (iv) a feature of a state of the vehicle when the action is taken by the vehicle;
    (v) a value of the action taken by the vehicle; and (vi) the action not taken by the vehicle.

11. A vehicle capable of operating autonomously, comprising:
    an interface;
    a processor configured to:
        determine a current state of the vehicle;
        create a behavior model of the vehicle by a model-based planning artificial intelligence solution that includes a decision tree and a plurality of trajectories, each trajectory including a plurality of nodes of the decision tree between the current state and a subsequent state;
        determine probabilities for the plurality of trajectories through the behavior model, wherein the probability of each trajectory is based on the plurality of nodes between the current state and the subsequent state;
        select a sub-trajectory of the trajectory, the sub-trajectory including a subset of the plurality of nodes between the current state and the subsequent state;
        select a significant action of the sub-trajectory;
        generate a message based on the significant action, the message to be presented as the vehicle performs a behavior that is determined by an artificial intelligence system, wherein the behavior is selected based on the probabilities;

determine a temporal parameter for the message;

determine a modality parameter for the message; and present the message at the interface using the temporal parameter and the modality parameter.

12. The vehicle of claim 11, wherein the processor is further configured to create the behavior model using a model-based planning artificial intelligence solution that is evaluated offline to produce the probabilities of transitions between states.

13. The vehicle of claim 11, wherein the processor is further configured to select a set of optimal trajectories from the plurality of trajectories and a set of optimal behaviors associated with the set of optimal trajectories based on a probability of the set of optimal trajectories.

14. The vehicle of claim 13, wherein the message explains a reason for the behavior of the vehicle, wherein the reason is based on at least one of: (i) an action taken by the vehicle; (ii) a sequence of actions taken by the vehicle; (iii) a feature of the action taken by the vehicle; (iv) a feature of a state of the vehicle when the action is taken by the vehicle;

(v) a value of the action taken by the vehicle; and (vi) the action not taken by the vehicle.

15. The method of claim 1, wherein each trajectory indicates one or more decisions from the current state to the subsequent state using the behavior model.

16. The method of claim 1, further comprising selecting the sub-trajectory using a certainty threshold.

17. The system of claim 6, wherein each trajectory indicates one or more decisions from the current state to the subsequent state using the behavior model.

18. The system of claim 6, wherein the processor is further configured to select the sub-trajectory using a certainty threshold.

19. The vehicle of claim 11, wherein each trajectory indicates one or more decisions from the current state to the subsequent state using the behavior model.

20. The vehicle of claim 11, wherein the processor is further configured to select the sub-trajectory using a certainty threshold.

* * * * *